J. BECKER.
COPYING OR ENLARGING CAMERA.
APPLICATION FILED APR. 26, 1912.

1,126,353.

Patented Jan. 26, 1915.

3 SHEETS—SHEET 1.

Witnesses
Mary E. Cowell
N. T. Howard Jr.

Inventor
Joseph Becker

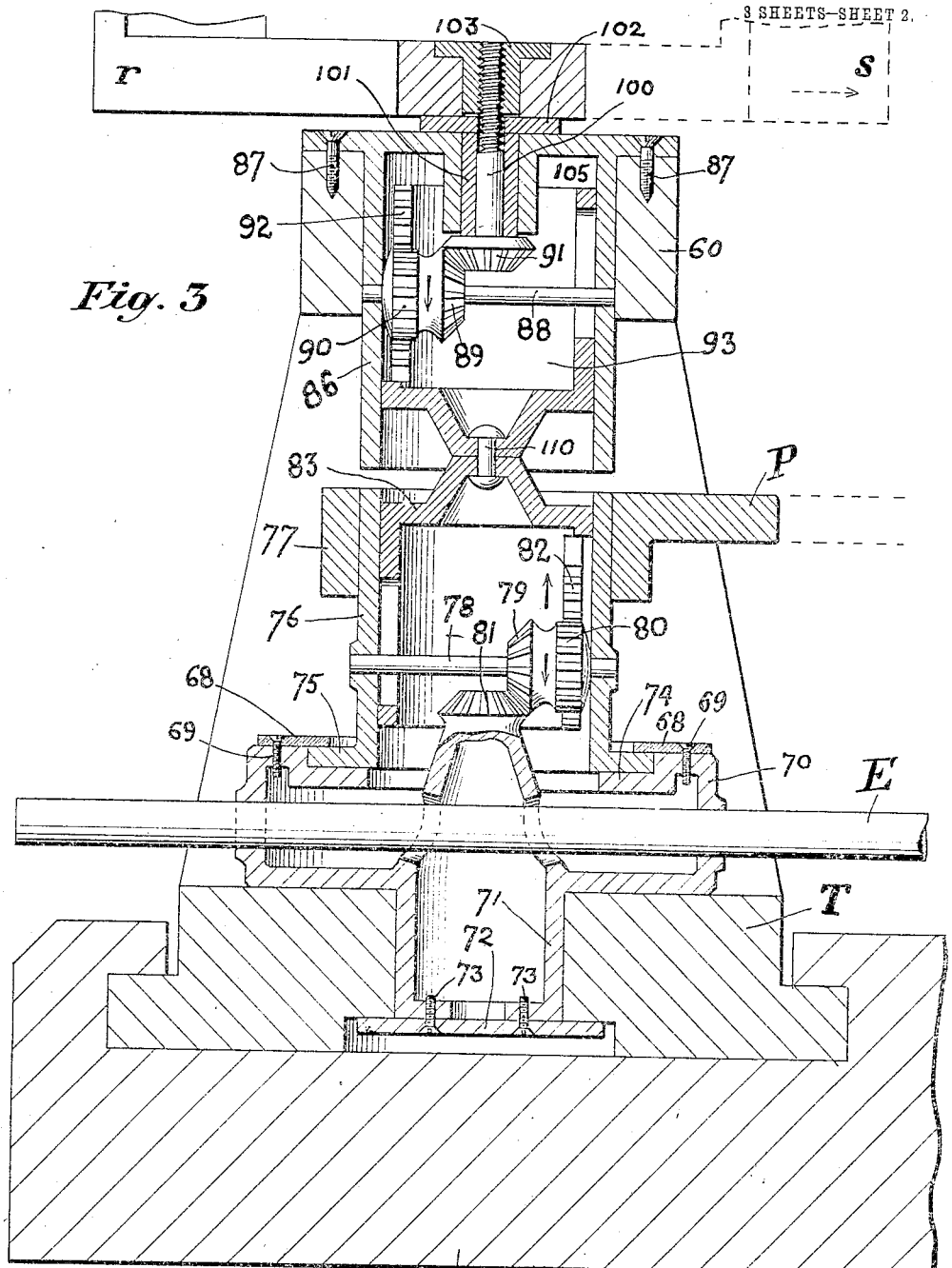

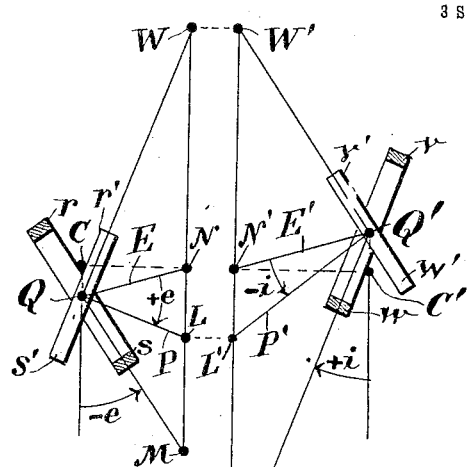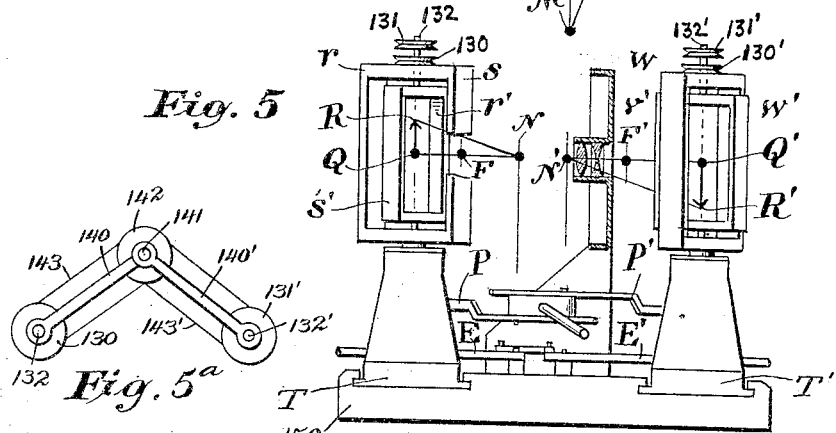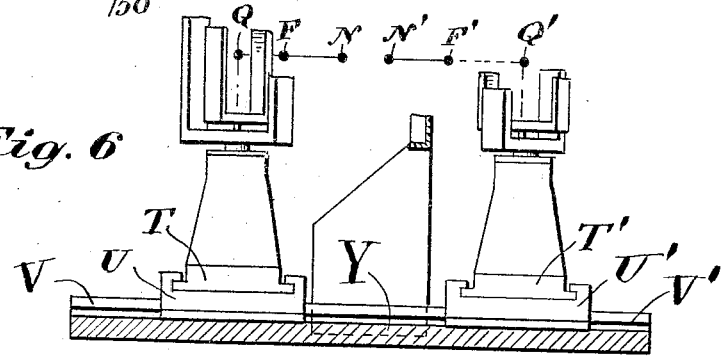

UNITED STATES PATENT OFFICE.

JOSEPH BECKER, OF WASHINGTON, DISTRICT OF COLUMBIA.

COPYING OR ENLARGING CAMERA.

1,126,353.

Specification of Letters Patent.

Patented Jan. 26, 1915.

Application filed April 26, 1912. Serial No. 693,390.

*To all whom it may concern:*

Be it known that I, JOSEPH BECKER, a citizen of the United States, residing at Washington, in the District of Columbia, have invented certain new and useful Improvements in Copying or Enlarging Cameras, of which the following is a specification.

The present application for patent is identified for convenience of reference in my other applications as Case V.

Figure 1:
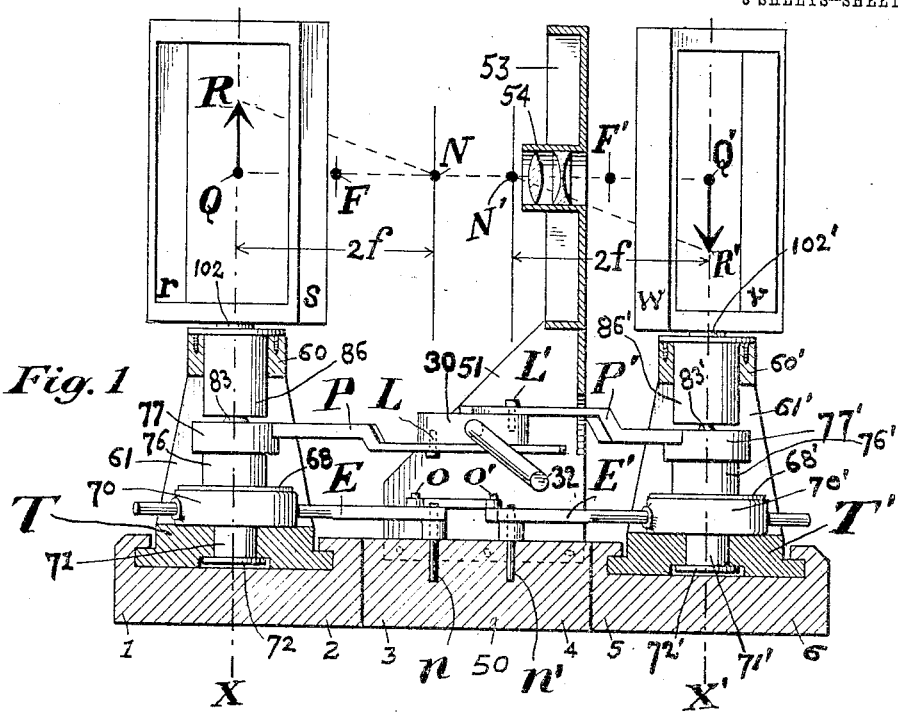
Figure 2:
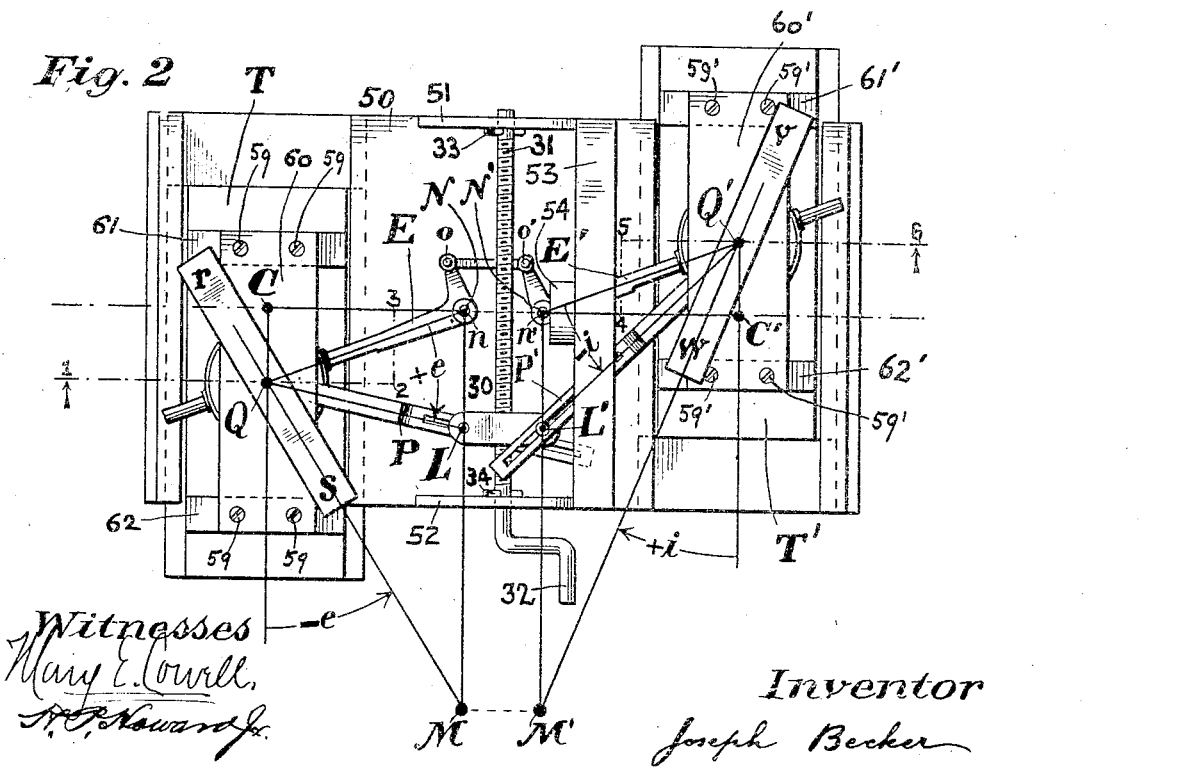

The main object of the present invention is to solve the mechanical problem that is set forth and involved in the diagram figures, Figures 2 and $2^a$ of United States Patent No. 752,596 of 1904 to Scheimpflug, such solution being adapted to serve in place of the evidently inadequate mechanism shown in his Figs. 1, $1^a$, $1^b$ and $1^c$ of the same patent.

Another object of the present invention is to solve the said mechanical problem in such manner as to permit of using lenses having an internodal space NN′ of finite value.

In the accompanying drawings: Fig. 1 is a partly sectional elevation of a camera with mechanism that is capable of acting in accordance with the principles of Scheimpflug's diagram figure, Fig. 2, and also capable of making proper allowance for a relatively large finite internodal distance NN′, the different planes of section being on the broken line 1, 2, 3, 4, 5 and 6 of Fig. 2, which is a plan view of the same camera. Fig. 3 is a vertical section of the left hand transmission gear used in the camera of Figs. 1 and 2, as well as in all other herein contemplated cameras; a similar view of the corresponding right hand transmission gear is obtained by holding a plane mirror on the lens side of Fig. 3 and adding prime marks to all the reference signs. Figs. 4 and 5 are respectively, a partial plan and a partly sectioned elevation of a camera with mechanism capable of acting in accordance with the principles of Scheimpflug's diagram figure, Fig. $2^a$, and also capable of making proper allowance for a relatively large finite internodal space NN′. Fig. $5^a$ is a plan of one of the two Boys transmissions that must be used in the camera of Figs. 4 and 5. Fig. 6 is a sectional elevation of parts belonging to a camera in every respect similar to the camera of Figs. 4, 5 and $5^a$, but provided with means to permit of imparting longitudinal displacements to the vertical end frame axes, in addition to all the other movements.

A characteristic feature of the Scheimpflug cameras here considered, consists in that they have their two end frames pivotally mounted on vertical diametral axes Q, Q′, Fig. 2, which are themselves mounted to slide transversely of the camera bed in conjugate planes QC, C′Q′ perpendicular to the lens axis; and such transverse displacements are made at such rates as to insure that the one pivotal axis Q′ shall always coincide with the vertical conjugate image of the other Q. During the transverse motions of such pivotal axes Q, Q′, therefore, there must not only be a constant ratio Q′C′/QC between the said transverse displacements, but also an equal and equally constant ratio Q′R′/QR between the height of a linear image Q′R′, Fig. 1, formed on the image frame axis and the height of its original linear element QR situated in the object frame axis; and this constant ratio Q′R′/QR is what I shall call the axial copying factor $n$.

In the drawings I show three distinct types of camera, to wit: type one, Figs. 1 to 3, with axial copying factor $n$ invariable and equal to unity; type two, Figs. 4, 5 and $5^a$, with axial copying factor $n$ invariable, but equal to one and three-tenths; type three, Fig. 6, with axial copying factor $n$ variable at will by focusing.

*Type one*, Figs. 1 to 3.—This type is founded on Scheimpflug's diagram figure, Fig. 2, in which the axial copying factor $n$ is invariably equal to unity. This is to say, $n$=Q′R′/QR=1. The bed of the camera is a massive block 50 having its ends grooved to form parallel slideways for the transversely movable carriages T, T′. To the sides of this bed 50 are fixed upright brackets 51, 52 supporting a lens frame 53 and on this a lens 54 which is fully defined for present purposes by its two nodal points N, N′ and its two principal foci F, F′. As the lens is stationary its four cardinal points F, N, N' and F' are themselves stationary and may be used as points of reference.

Onto carriage T are firmly bolted by long screw bolts 59 a table 60 and its supporting legs 61, 62 to form a solid whole with the carriage T; and onto carriage T' are similarly bolted by bolts 59' a table 60' with its supporting legs 61', 62'. Upon these tables 60, 60' are, respectively, pivoted the two end frames $rs$, $vw$ of the camera; frame $rs$ being pivoted on the vertical axis QX, Fig. 1, and frame $vw$ on the vertical axis Q'X'. These axes QX, Q'X' are thus mounted to move in the transverse vertical planes QC, Q'C' (Fig. 2) which are perpendicular to the lens axis CC'. The distances CN, C'N' of these transverse planes from the nodal points N, N' of the lens should each be exactly equal to twice the focal length $f$ of such lens as indicated at $2f$ in Fig. 1.

No restrictions whatever are placed as in Scheimpflug (lines 48 to 74, page 3, and Figs. 1 and 2 of his German Patent 164,527) on the type of lens to be used; and to make this point perfectly clear the drawing is made to show an unsymmetrical combination lens having an internodal distance NN' equal to eight-tenths of the focal length. If, therefore, the focal length FN be represented by 10, the internodal distance NN' will be 8 and the distances CN, C'N' will each be 20. In order that these axes QX, Q'X' shall remain conjugate, they are connected as in Scheimpflug by mechanism that causes them to move simultaneously through equal distances QC and Q'C', Fig. 2, away from the vertical medium plane CC' of the camera. In Scheimpflug this mechanism consists in a centrally pivoted lever E; but in my device the lever is divided into two arms E, E' pivoted to the camera bed 50 by pins $n$, $n'$, the axes of which are coincident with the vertical lines through the nodal points N, N' of the lens. These arms E, E' have equal rectangularly extending crank arms $no$, $n'o'$ connected by a link $oo'$ equal in length to $nn'$ and to the internodal distance NN'.

The figure $oo'n'n$ constitutes an articulated parallelogram which obliges the arms E and E' to remain parallel, so that turning arm E, for instance, to increase or to decrease the distance QC will turn arm E' through the same angle to simultaneously and by the same amount increase or decrease the distance Q'C'. Throughout all movements of the frames, therefore, an object QR in axis QX, Fig. 1, will have its conjugate and sharpest image formed in the opposite axis Q'X' at Q'R', and Q'R' will remain exactly equal to QR.

The connection between arm E and its corresponding carriage T is effected by means of a drum like casting 70, having a stud like extension 71 fitted into the carriage T and pivotally held in place by the retaining plate 72 and machine screws 73, as most clearly seen in Fig. 3. Arm E passes diametrically through the drum 70 and is fitted to slide smoothly through the drum while turning it on its carriage T to move the carriage in its slideway on the camera bed.

The connections at the right hand end between arm E' and carriage T' are similar to those at the left just described, and are correspondingly referred to as 70', 71', 72'. The vertical axes Q, Q', Fig. 2, being thus kept in focus on each other if one of the end frames $rs$, for instance, be inclined so that its focal plane shall meet the principal or nodal plane N in a point M, the opposite end frame to remain in focus should be inclined to meet the nodal plane N' at point M' which is the image of M. Frame $vw$ is thus turned in clockwise direction through an angle, plus $i$, and frame $rs$ is turned in counter-clockwise direction through a generally different angle, minus $e$. Now let an arm P be provided pivoted on the same axis Q as frame $rs$, but adapted to form an angle plus $e$ with arm E whenever frame $rs$ has been turned through an angle minus $e$; plus indicating clockwise rotation and minus counter-clockwise rotation as before. Furthermore, let an arm P' be provided pivoted on axis Q' and adapted to form an angle minus $i$ with arm E when frame $vw$ has been turned through an angle plus $i$. Then the triangles MNQ and QNL are similar and yield $$\frac{NL}{NQ} = \frac{NQ}{NM}$$

whence $$NL = \frac{NQ \times NQ}{NM} \quad (1)$$

The triangles M'N'Q' and Q'N'L' similarly yield $$N'L' = \frac{N'Q' \times N'Q'}{N'M'} \quad (2)$$

But NQ and N'Q' are kept equal by the lever arms E, E' and NM must be equal to N'M', it follows that the right hand members of equations (1) and (2) are identical and that NL will always equal N'L'. Pins L and L' are, therefore, provided to be moved in the principal or nodal planes NM, N'M' by a nut 30 on which they are mounted and this nut is made to travel on a screw 31 which is mounted in the brackets 51, 52, free to be turned by the handle 32, but held against longitudinal motion by the split pins 33, 34.

It now remains to explain how the relative angular motions of arms P, E are transmitted to the frame rs, and how the relative angular motions of arms P', E' are transmitted to frame vw, this being the main feature of the present invention. Referring more particularly to Fig. 3, the drum 70 has an annular depressed horizontal flange 74 in which is rotatably seated the lower horizontal flange 75 of a hollow cylinder 76. The flange 75 is held by the retaining ring 68 which is fastened to drum 70 by machine screws 69. To the upper end of the hollow cylinder 76 is firmly attached a ring 77 having as radial extension, the arm P above referred to, and by means of which the cylinder 76 may be turned with relation to drum 70. The cylinder 76 carries a horizontal diametral spindle 78 on which is mounted the combined bevel and spur gear 79, 80. The bevel part 79 meshes with a similar bevel wheel 81 which is formed as a fixed part of the drum 70 so that rotating arm P toward the observer or in clockwise direction will cause the gear wheel 79, 80 to revolve as indicated by the arrow. The spur gear 80 at the back or rising side engages a straight rack 82 formed longitudinally in the recessed wall of cylindrical shell 83 which cannot rotate in shell 76, but is left free to rise or fall, according to the direction of rotation of arm P with relation to arm E, and in direct proportion to such relative angular displacement. That is to say, if shell 83 rises one millimeter for a clockwise displacement of P on E of one degree it will rise $n$ millimeters for $n$ degrees of clockwise rotation, or fall $n$ millimeters for a counter-clockwise rotation of $n$ degrees. To every angular position of P with relation to E, therefore, corresponds a certain height of shell 83 and this height is not changed by rotating both P and E through equal angles. The relative angular displacements of arms P and E are, therefore, translated into vertical displacement along the axis QX. These vertical displacements of shell 83 are translated into rotations to be imparted to the end frame rs, through a swivel pin 110, by means of a similar shell 93 guided to rise and fall in the hollow cylinder 86 which is fastened to the table 60 by screws 87.

Shell 86 has a diametral spindle 88 with combined spur and bevel gear wheel 89, 90. The bevel part 89 engages a similar bevel wheel 91 and the spur part 90 engages the vertical rack 92 cut in the wall of shell 93. As the rack 92 rises it turns the visible part of the gear wheel 89, 90 downwardly as indicated by the arrow and this produces counter-clockwise rotation of bevel wheel 91, that is, counter-clockwise as seen looking downwardly from a point above the camera.

Wheel 91 is directly bolted to frame rs by its threaded shank 100, which passes through the sleeve 101 and washer 102 into the flanged clamp nut 103. Sleeve 101 is made a trifle longer than the bearing sleeve 105 of the cylinder 86 to permit of firmly clamping the parts 91, 100, 101, 102, 103 firmly together and with frame rs to form a solid whole without endwise clamping the bearing 105, so that the wheel 91 and its frame rs will revolve freely as one part in the bearing 105.

The four bevel wheels 79, 81, 89, 91 are all of the same size; and the two spur wheels 80, 90 are also alike; and accordingly any clockwise rotation of arm P with relation to arm E is transmitted as an equal but counter-clockwise rotation to frame rs; or generally the relative, plus or minus, angular displacements of arm P with relation to arm E are transmitted as absolute, minus or plus, rotations of frame rs. A purely relative angular displacement is thus finally transmitted as an absolute angular displacement of equal extent, but opposite in direction. Such is the principal mechanical problem implied, if not clearly stated, in Scheimpflug, and my present solution is, to the best of my knowledge and belief, the first satisfactory solution ever proposed. The angular positions of the right hand end frame vw are similarly controlled by parts which, so far as they appear in Fig. 1, have corresponding reference signs E', 68', 70', 76', 77', 83', 86', 102' and arm P'.

*Operation of "type one."*—The vertical axes Q and Q' move in the planes of unit magnification CQ, C'Q' of the lens, Fig. 2, and they never leave such planes. They are, moreover, moved and held by levers E and E' so that the offset QC shall always be opposed and exactly equal to the offset Q'C'. Any part QR, Fig. 1, of the vertical axis Q, therefore, has its image Q'R' formed by the lens in the vertical axis Q'. The ratio Q'R'/QR, Fig. 1, which I have termed the "axial copying factor," therefore, equals 1, and it remains 1 for all values of the horizontal offset QC, Q'C', in Fig. 2. This horizontal offset QC, Q'C', Fig. 2, is controlled exclusively by levers E and E', and the offsetting action of these levers E, E' is entirely independent of the position or operation of arms P and P'. The inclination of the end frames rs, vw, however, is jointly dependent upon the positions of levers E, E' and arms P, P'; or, solely dependent upon the values of the relative inclinations $n$QL and $n'$Q'L', Fig. 2, of such arms and levers.

When the nut 30 is set to hold pins L and L' directly over pins $n$ and $n'$, the relative inclination of arm P to lever E and that of arm P' to lever E' are both nil, and the end frames rs, vw are held in parallel relation;

or with their image planes QM, Q'M' perpendicular to the lens axis CC', Fig. 2; and this is so for all possible values of the inclination of levers E and E' and of the horizontal offset CQ, C'Q'. In any such parallel relation of the end frames any original outline mounted anywhere in the image plane of the object frame rs is projected by the lens onto the parallel image plane of the image frame vw, and this projected image is of the same outline or shape and of the same size as the original. By turning handle 32, however, to shift nut 30 from its central position the arm P is inclined with relation to the lever E at an angle plus e (+e), Fig. 2, for instance, and the end frame rs is inclined at the corresponding angle minus e (−e), these angles plus e and minus e being opposite in sign, but numerically equal. At the same time the arm P' was necessarily inclined with relation to the lever E' at an angle minus i (−i) and the object frame vw was inclined at the corresponding angle plus i (+i), these angles minus i and plus i being likewise opposite in sign, but numerically equal.

The co-varying angles e and i are always such that the image plane QM of rs and th image plane Q'M' of vw, when produced, will always meet the nodal or principal planes of the lens in conjugate or directly opposite points M and M'; and as axes Q and Q' of these image planes are also always conjugate, the two end frames rs, vw always remain sharply in focus on each other for all positions of their axes Q, Q' and at all possible inclinations.

When the end frames rs, vw are inclined to each other as in Fig. 2, therefore, the projected image is still sharply focused at every point; but the outline of such image is no longer of the same shape as the outline of the original, and these changes in shape can evidently be varied at will by changes made in angle e and by displacing the original in the image plane QM of the object frame rs; and such latter displacements permit of producing at the same time certain limited changes in the size of the image; all in accordance with the well established geometrical principles of perspective, as the internodal space NN' simply offsets all lines of the image space through the distance NN' without producing any change in their size or inclination.

*Type two*, Figs. 4 to 5ª.—Here the copying factor n is also invariable as in "type one," but it differs from unity, being equal to one and three-tenths (1.3) in the form selected for illustration. The two vertical axes Q and Q' must accordingly move in conjugate planes QC, Q'C', Fig. 4, that are not the planes of unit magnification, but the mechanism of Figs. 1 to 3 may still be used to act, as in "type one," in serving to keep the end frame rs turned through an angle of minus e degrees when arm P performs an angle of plus e degrees with arm E; and in serving to keep the frame vw turned through an angle of plus i degrees when the arm P' forms an angle of minus i degrees with the arm E'. The points M and M', however, where the focal planes of the end frames meet the principal or nodal planes NN' are no longer opposite as they should be, but are, on the contrary, considerably offset as seen in Fig. 4 and must necessarily be so, as will be understood from the following analysis. The similar triangles MNQ and QNL, Fig. 4, with angle N in common, yield $$\frac{MN}{NQ} = \frac{NQ}{NL}$$

whence $$MN = \frac{NQ \times NQ}{NL} \quad (3)$$

The similar triangles M'N'Q' and Q'N'L' likewise yield the result $$M'N' = \frac{N'Q' \times N'Q'}{N'L'} \quad (4)$$

Dividing equation (4) by equation (3) and noting that NL and N'L' being structurally equal must cancel, we have $$\frac{M'N'}{MN} = \left(\frac{N'Q'}{NQ}\right)^2 \quad (5)$$

By this last equation M'N' can only equal MN when N'Q' equals NQ as in Figs. 1 and 2. In all other cases they differ as the square of the copying factor differs from unity. Thus in Fig. 4 where the copying factor is 1.3 the ratio of M'N' to MN is 1.3×1.3, or approximately 1.7. In this case, therefore, it becomes necessary to resort to the principle of operation embodied in Fig. 2ª of the said Scheimpflug United States patent. In carrying out this principle I pivot inside of frame rs a smaller frame r's' which should be held parallel to the opposite larger frame vw; and I similarly pivot inside of frame vw a smaller frame v'w' which should be held parallel to the opposite larger frame rs. These two smaller frames r's', v'w' will then meet the principal or nodal frames N, N' in directly opposite points W, W' (Fig. 4) and should be used as the end frames proper of the camera in place of the larger frames rs and vw.

The geometrical principles involved in the structure of Figs. 4 and 5 will now be given. In Fig. 4, triangles WQN and M'Q'N', though variable, always have corresponding sides parallel by construction, and, therefore, remain similar, yielding $$\frac{WN}{M'N'} = \frac{NQ}{N'Q'}$$

whence $$WN = M'N' \times \frac{NQ}{N'Q'}$$

and this, in view of equation 5, becomes $$WN = MN \times \frac{N'Q'}{NQ} \quad (6)$$

Triangles MQN and W'Q'N', Fig. 4, are also always similar, yielding $$W'N' = MN \times \frac{N'Q'}{NQ} \quad (7)$$

Dividing (6) by (7), we have $$\frac{WN}{W'N'} = 1$$

and finally $$WN = W'N' \quad (8)$$

That is to say, the object frame $r's'$ and the image frame $v'w'$ are always inclined so as to meet the principal or nodal planes N, N' in directly opposite and conjugate points W, W'. The inclination of the object frame $r's'$ is indicated by angle W which equals the inclination $+i$ of the opposite larger frame $vw$; and the inclination of the image frame $v'w'$ is indicated by angle W' which equals the inclination $-e$ of the opposite larger frame $rs$.

Equations 1 to 8, it should be noted, apply strictly and exclusively to the plan views, Figs. 2 and 4, and not to the space figures which yield such plan views by projection. It is accordingly necessary to provide some means for keeping the object frame $r's'$ parallel to its controlling frame $vw$; and means for keeping the image frame $v'w'$ parallel to its controlling frame $rs$. To transmit these angular motions I provide pulleys 130, 130' which are rigidly fastened to the larger frames $rs$, $vw$ to turn with them; and equal pulleys 131, 131' which are keyed to turn with the spindles 132, 132', that are respectively fastened to the inside smaller frames $r's'$, $v'w'$. These different pulleys are connected by a suitable belt transmission such as that used in the "Integrator" of C. V. Boys, Fig. 2, page 344, of the article on pages 342 to 345 of the London, Edinburgh and Dublin "*Philosophical Magazine*" for May, 1881.

The Boys' transmission used for keeping the inside frame $v'w'$ parallel to the outside frame $rs$ is shown in Fig. 5ª as comprising two links 140, 140' with a loose pulley 142 of the same diameter as pulleys 130 and 131'. Pulley 142 is connected to pulley 130 by a belt 143; and to pulley 131' by a second belt 143'. The links 140, 140' are preferably made of equal length and this must be a little longer than half the greatest contemplated separation of spindles 132, 132'. The Boys transmission used for keeping the inside frame $r's'$ parallel to the outside frame $vw$ is the symmetrical duplicate of Fig. 5ª obtained by holding a plane mirror in the vertical plane of axes 132, 132' and by changing the reference signs 130 and 131', respectively, to 131 and 130'. This pair of Boys transmissions permits of making all desirable changes in the positions of axes Q and Q', Fig. 4, without in any way disturbing the inclination of any one of the four connected frames $rs$, $vw$, $r's'$ and $v'w'$, except as required by the changes that the displacement of axes Q and Q' may have produced in angles plus $e$ ($+e$) and minus $i$ ($-i$).

The type two camera can be constructed to have an axial copying factor $n$ equal to one, but in this case it becomes a needlessly complicated equivalent of type one.

*Operation of "type two."*—The camera of "type two," Figs. 4 to 5ª, is mechanically much more complicated than the camera of "type one," Figs. 1 to 3, but the final result is substantially the same as described above under the head "Operation of type one." The only differences to be noted are that the end frames proper of "type two" are not $rs$ and $vw$, but $r's'$ and $v'w'$; also that, when these end frames $r's'$ and $v'w'$ are in parallel relation, perpendicular to the lens axis CC', the similar projected image is no longer equal to the original, but has all its linear elements multiplied by $n$, or one and three-tenths in the camera chosen for illustration.

*Type three*, Fig. 6.—The axial copying factor $n$ in "type three," Fig. 6, is variable at will. This camera is made by simply taking a camera of type two, Figs. 4 to 5ª, and substituting for the base or bed 150, Fig. 5, the combination of base Y and slides U and U' of Fig. 6. The slides U, U' are longitudinally movable in ways V, V' of base Y, and they may be so moved to set and hold the vertical axes Q and Q' in any preferred pair of conjugate planes. This is done by focusing in any preferred manner with a ground glass or by automatic focusing gear, as in the combined focusing and tilting gear of my Case L' Serial No. 870,066 originally filed as Case L November 4, 1905, Serial No. 285,802.

As long as the slides U and U' remain stationary in a properly focused relation the camera is to all intents and purposes a "type two" camera; and, therefore, a single type three camera is capable of doing the work of an almost infinite series of type two cameras.

When a type three camera is set for copying factor $n$ equal one, its effects are virtually the same as those of type one.

In converting a "type two" camera into a "type three" camera the only precaution to be observed is to see that the links 140, 140' of Fig. 5ª, the levers E, E' of Fig. 5 and the arms P, P' of Fig. 5 are all of the proper lengths required to permit the extreme contemplated displacements of U, U', T and T'.

Note 1: Figs. 1, 1ª, 1ᵇ, 1ᶜ, 2 and 2ª of the said Scheimpflug United States Patent No. 752,596 correspond, respectively, to Figs. 5 to 10 of the Scheimpflug German Patent No. 164,527 of 1905; also, respectively, to Figs. 17, 17ª, 17ᵇ, 17ᶜ, 18 and 18ª of the Scheimpflug British Patent No. 1,196 of 1904; but this German patent and this British patent do not seem to disclose anything more for present purposes than appears in the said United States patent, except that the German patent contains the clearest written description.

Note 2: In view of Figs. 8 to 8ᵉ of the Scheimpflug Austrian Patent No. 20,299 of 1905, showing an enlarging camera with a funicular transmission for cross-connecting the two pivoted end frames $rs$ and $vw$, with oppositely pivoted mirror-frames $l_1$, $l_2$, it would seem that my pulley 142, Fig. 5ª, could be mounted to slide on top of the lens frame as a plain sliding belt tightener inside of a single continuous belt surrounding the three pulleys 130, 131' and 142; but such combination would be inoperative for present purposes, as no change could be made in the distance separating the two axes 132, 132' without rotating at least one of the two connected frame pulleys 130, 131'.

Note 3: The transmission gear of Fig. 3 or some equivalent means for converting the relative lever inclinations plus or minus $e$ ($\pm e$) into absolute object frame inclinations minus or plus $e$ ($\mp e$); and a duplicate of such transmission for converting the relative lever inclinations minus or plus $i$ ($\mp i$) into absolute image frame inclinations plus or minus $i$ ($\pm i$); together constitute an indispensable part of every type one, type two or type three camera herein considered or referred to.

What I claim, therefore, as my invention and desire to secure by Letters Patent is:

1. The combination with a photographic copying or enlarging camera having its end frames pivotally mounted on parallel axes; of transversely movable supports for such axes, and means for moving such supports to carry such pivotal parallel axes in opposite directions away from the longitudinal median plane of the camera through distances that are proportional to the conjugate nodal distances of such pivotal axes, and means for simultaneously turning such end frames on their said pivotal axes in opposite directions and in such manner as to cause the image planes of such end frames to meet the principal or nodal planes of the lens in opposite conjugate lines of such principal or nodal planes.

2. The combination with a photographic copying or enlarging camera having its end frames pivotally mounted on parallel axes coincident with conjugate axes of their two image planes; of transversely movable supports for such axes, and lever arms acting on such supports where they are met by such pivotal axes to move such supports in opposite directions away from the longitudinal median plane of the camera through distances that are proportional to the conjugate nodal distances of such pivotal axes; and other arms pivotally mounted on such same pivotal axes to rotate such end frames in opposite directions through angles determined by the relative inclinations of the two sets of operating arms, and means for transmitting such relative angular displacements of the said arms to the said end frames, such transmitting means comprising means for first translating such relative angular displacements as longitudinal displacements along or parallel to the axes of rotation of such end frames.

3. The combination with a copying or enlarging camera having its object, lens and image frames connected by mechanism to produce simultaneous transverse displacements of such end frames, such mechanism comprising means for transferring motions from the one end frame to the other, such means having two pivotal axes respectively located where a meridianal plane of the lens meets its two nodal planes.

4. The combination with a copying or enlarging camera comprising a lens frame, and two end frames mounted to rotate on axes that are parallel and adjustable to vary their distances from the longitudinal median plane of the lens, of mechanism connecting said end frames and adapted to cause them to revolve simultaneously in opposite directions so as to meet the principal planes of the lens in conjugate points M. M'.

In testimony whereof, I have signed my name to this specification in the presence of two subscribing witnesses.

JOSEPH BECKER.

Witnesses:
  H. P. HOWARD, Jr.,
  CLARENCE MILLER.